Nov. 1, 1955 S. J. SMITH Re. 24,082

CAPACITANCE TYPE LIQUID QUANTITY GAUGE

Original Filed Jan. 12, 1949

INVENTOR

Stanley J. Smith

By Watson, Cole, Grindle + Watson

United States Patent Office

Re. 24,082
Reissued Nov. 1, 1955

24,082

CAPACITANCE TYPE LIQUID QUANTITY GAUGE

Stanley J. Smith, Briarcliff, N. Y., assignor to Simmonds Development Corporation Limited, Strand, London County, Great Britain, a British corporation Original No. 2,582,399, dated January 15, 1952, Serial No. 70,494, January 12, 1949. Application for reissue January 14, 1953, Serial No. 331,338
5 Claims. (Cl. 317—246)

Matter enclosed in heavy brackets [ ] appears in the original patent but forms no part of this reissue specification; matter printed in italics indicates the additions made by reissue.

In capacitance type liquid quantity gauges, measurement of liquid quantity is effected by means of a capacitor which usually comprises two spaced electrodes extending between the top and the bottom of a container for the liquid. For reasons of convenience in manufacture and of structural strength, such measuring capacitors are commonly tubular in form and comprise two [aluminium] *aluminum* tubes separated by a minimum of solid dielectric material. Such a construction provides a capacitor in which the capacitance per unit length is substantially constant, and a linear change in capacitance in terms of liquid level will be obtained.

Since the electrical system of a capacitance type gauge is usually designed so that the indication is proportional to capacitance change it follows that the indicator may be calibrated linearly in terms of liquid level and also in terms of liquid quantity or mass if the container is of regular shape so that the surface area of the liquid is constant at all levels.

However, it is not unusual for liquid containers to be constructed of irregular shape in which the relation between change in liquid quantity and change in level at a given point is not constant. Examples are aircraft fuel tanks which are fitted to the airplane structure and which may assume a variety of relatively complex shapes. In these cases, it is possible to calibrate the dial of the indicating device so that the correct quantity will be indicated, but the scale will be non-linear and difficult to read. When more than one measuring capacitor is used in a tank, in order to correct for changes in aircraft attitude, it is essential that the change in capacitance per unit volume or mass of fuel be identical for all units and this is also necessary in cases where the contents of two or more tanks must be displayed on one indicator.

It is known for this purpose to modify the normally uniform capacitance-length law of a measuring capacitor consisting of concentric metal tubes by control of the diameter of or removal of wall material from one of the tubes. Such methods however weaken the structure and are not adapted to quantity production of capacitors to close tolerances.

The present invention has for an object the provision of an improved form of measuring capacitor in which the capacitance per unit length may be made to follow any desired law.

Other objects of my invention and the advantages flowing therefrom will be apparent from the following description of the invention with reference to the accompanying drawing, in which Figure 1 is an elevation of one form of measuring capacitor;

Figure 1:
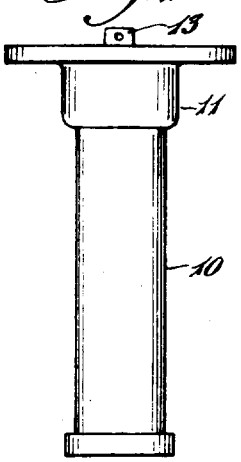
Figure 2:
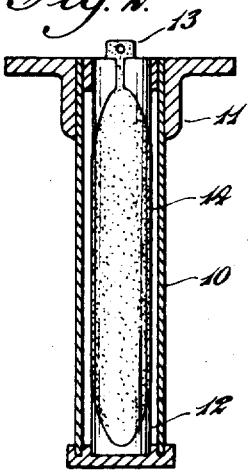
Figure 2 is a vertical section of the capacitor shown in Figure 1.
Figure 3:
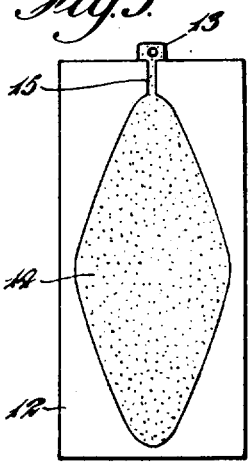
Figure 3 is a developed view of the surface of the inner electrode of the capacitor of Figures 1 and 2.

Referring now to Figures 1 to 3 the measuring capacitor here shown comprises an outer tubular electrode 10 made of conductive material, preferably [aluminium] *aluminum*, which is secured at one end to a flange 11 whereby the capacitor may be mounted on a liquid container. The capacitor also comprises an inner tube 12 which is spaced from the outer electrode 10 by insulating means and which is made of an insulating material such as a phenolic resin impregnated paper. The outer surface of tube 12 is coated with a conductive material such as by spraying the tube with [aluminium] *aluminum* or zinc vaporized in a spray gun according to known methods. Electrical connection with this conductive layer may be effected by means of a terminal member 13 which is riveted or otherwise secured to the tube 12 and connected electrically with the conductive layer.

If the conductive layer is applied uniformly all round the tube 12 the capacitor will have a uniform capacitance per unit length. If however the conductive layer is arranged so that it does not cover all the surface of the tube 12, the law relating capacitance and length may be made non-uniform to any desired extent.

In the form shown in Figures 1 to 3 the conductive layer 14 applied to the surface of the tube 12 is of greatest width at the central portion of the tube and tapers towards the upper and lower ends, being connected at the upper end with terminal 13 by a strip of conductive material 15. By a suitable design of the shape of the conductive layer in relation to the shape of the liquid container the indicating device may be calibrated linearly in terms of mass or volume of liquid. More specifically, if the width of the conductive layer at any height along the tube is made proportional to the surface area of the liquid in the container at that height then, if the indicator follows a linear law as regards change in capacitance, the indicator may be calibrated to show linearly change in volume or mass of liquid in the container.

Accordingly when the shape of the container is known, however irregular it may be, a mask may be designed to control the extent to which the surface of the tube is coated with a conductive layer during a metal spraying process, and any number of electrodes may be constructed all of which in conjunction with an outer electrode will give a capacitor having the desired law.

As pointed out in the specification of my prior application for Letters Patent Serial No. 66,222, filed December 20, 1948, *and which is now abandoned*, it is most desirable that for the purpose of standardization the initial or "empty" capacitance of measuring capacitors may be adjusted and the construction described in that specification may be adapted for use with the measuring capacitor of this invention.

Figure 4:
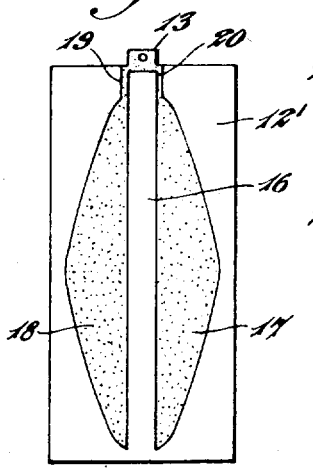
Figure 4 is a similar view of an alternative form of inner electrode.
Figure 5:
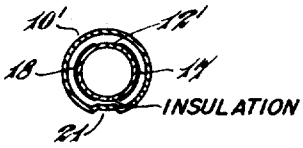
Figure 5 is a cross section through a capacitor using the electrode of Figure 4.

Referring now to Figures 4 and 5 it will be seen that the developed view of the inner tube 12' shown in Figure 4 is generally the same as that of tube 12 shown in Figure 3 except that there is an uncoated longitudinally extending strip 16 between two coated portions 17 and 18 which are connected to terminal 13 by coated strips 20 and 19 respectively. As seen in cross section in Figure 5 this uncoated strip 16 may be arranged to be situated adjacent an inwardly directed corrugation 21 formed in the outer electrode tube 10'. By rotating the tube 10' relatively to the tube 12' the corrugation 21 may be made to approach the edge of the coated portion 17 or 18 and the initial capacitance will accordingly be changed uniformly along the length of the capacitor.

Figure 6:
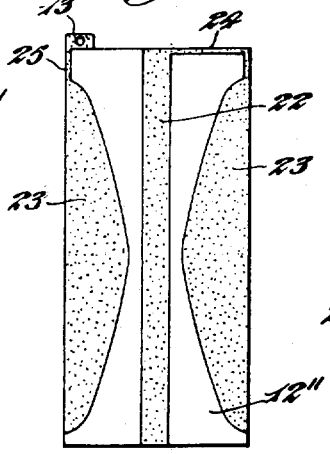
Figure 6 is a view, similar to that of Figure 3, of a further alternative form of inner electrode.
Figure 7:
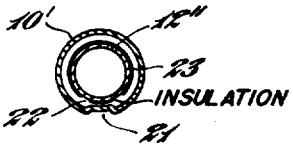
Figure 7 is a cross section through a capacitor using the electrode of Figure 6.

In a converse arrangement shown in Figures 6 and 7 the inner tube 12'' has the coated strip 22 instead of the uncoated strip 16 so that relative movement of the corrugation 21 and strip 22 will change the initial capacitance. Strip 22 is spaced from a coated portion 23 and the coated portions 22 and 23 are connected to terminal 13 by coated strips 24 and 25.

Figure 8:
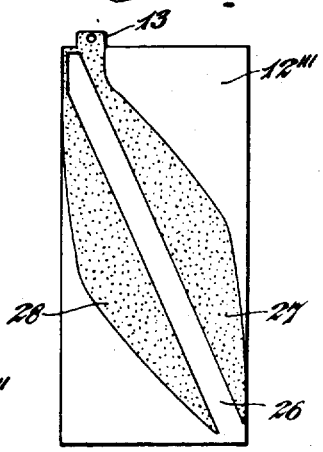
Figure 8 is a view, similar to that of Figure 3, of a still further form of inner electrode.
Figure 9:
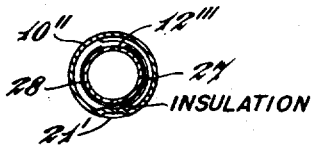
Figure 9 is a cross section through a capacitor using the electrode of Figure 8.

If desired the uncoated strip 16 (or equivalently the coated strip 22) may be arranged to extend spirally round the surface of the inner tube for co-operation with a spirally arranged corrugation in the outer tube. In Figures 8 and 9 the inner tube 12'' has a spirally-arranged uncoated strip 26 extending between coated portions 27 and 28 and co-operating with a spirally-arranged corrugation 21' on the outer tube 10''.

It will be evident that by a suitable disposition of the coated portions of the inner tube there may be provided a number of longitudinally or spirally extending uncoated strips for cooperation with suitably disposed corrugations on the outer tube so that the initial capacitance may be adjusted by relative rotation of the tubes without alteration of the desired capacitance-length law.

I claim:

*1.* A capacitance type gauge for immersion in an irregularly shaped container for a dielectric liquid to measure variations in the [depth] *quantity* of the liquid comprising, in combination, two tubular [electrodes] *electrode members* of different diameter, means mounting said [electrodes] *members* in telescoped, normally fixed, radially spaced relation, said mounting means being constructed to permit relative circumferential adjustment of said [electrodes] *members,* one of said [electrodes] *members* comprising a tube of insulating material having on a part only of a surface thereof a conductive layer, said conductive layer being irregularly shaped and so related to the shape of the container that the circumferential extent [thereof] *of said layer* at any given depth of liquid is proportional to the surface area of the liquid at that depth, said conductive layer being formed to define on said insulating tube a non-conducting, longitudinally extending area, the other of said [electrodes] *members* being deformed in the direction of the length thereof, and over substantially the entire length thereof, to provide as viewed in transverse section, segments of different radius [, and means for effecting relative circumferential adjustment of said electrodes for initially adjusting the capacity of said gauge when immersed in said container to a given depth].

*2. In a capacitance-type gauge for measuring variations in the quantity of a dielectric liquid present in an irregularly shaped container wherein there is a non-linear relationship between change in liquid level and change in liquid quantity in such irregular container, a capacitor comprising two electrode members having spaced electrode surfaces with a predetermined initial capacitance therebetween and adapted to be mounted in the irregular container for immersion in the liquid therein to substantially the entire depth of the liquid and to receive the liquid in the space between said members, one of said electrode members comprising insulation material having on a part only of a surface thereof a conductive layer constituting the electrode surface of said one member, said conductive layer having a shape so related to the irregular shape of the container that the surface-level length of contact of said layer at every level of liquid is proportional to the surface area of the liquid in the irregular container at that level, the other of said electrode members being provided with a raised corrugation in its electrode surface extending over the entire length thereof and projecting in the direction of said one electrode*

*member, said electrode members being arranged for movement relative to each other while maintaining a fixed spacing therebetween such that said corrugation varies its position with respect to an edge of the conductive layer of said one electrode member thereby to provide an initial adjustment of said initial capacitance which changes uniformly along the length of the capacitor, whereby the change in capacitance of said electrode surfaces varies linearly with change in the quantity of liquid present in the container notwithstanding the irregular shape of the container.*

*3. In a capacitance-type gauge for measuring variations in the quantity of a dielectric liquid present in an irregularly shaped container wherein there is a non-linear relationship between change in liquid level and change in liquid quantity in such irregular container, a capacitor comprising two concentric substantially tubular electrode members having spaced electrode surfaces with a predetermined initial capacitance therebetween and adapted to extend substantially between the top and bottom of the irregular container and to receive the liquid in the space between said members so that the capacitance of said electrode surfaces is a function of the level of liquid in the container, means mounting said electrode members for permitting relative circumferential adjustment thereof, one of said members comprising a tube of insulation material having on a part only of a surface thereof a conductive layer of substantially uniform thickness constituting the electrode surface of said one member, said conductive layer having a shape so related to the irregular shape of the container that the circumferential extent of said layer at every level of liquid is proportional to the surface area of the liquid in the irregular container at that level, the other of said members being provided throughout most of its area with an electrode surface portion uniformly spaced from said one member and a strip portion of substantially uniform width extending from the top to the bottom thereof, said strip portion being disposed at a different spaced distance from said one member to provide a different capacitance relationship thereto, the extent of overlap of said strip portion with respect to the electrode surface of said one member being adjustable through said circumferential adjustment to provide an initial adjustment of the capacitance between said two members in a uniform manner along the length of the capacitor, whereby the change in capacitance of said electrode surfaces varies linearly with change in the quantity of liquid present in the container notwithstanding the irregular shape of the container.*

*4. In a capacitance-type gauge for measuring variations in the quantity of a dielectric liquid present in an irregularly shaped container wherein there is a non-linear relationship between change in liquid level and change in liquid quantity in such irregular container, a capacitor comprising two electrode members having spaced electrode surfaces with a predetermined initial capacitance therebetween and adapted to be mounted in the irregular container for immersion in the liquid therein to substantially the entire depth of the liquid and to receive the liquid in the space between said members, one of said electrode members comprising insulation material having on a part only of a surface thereof a conductive material constituting the electrode surface of said one member, the extent of said conductive material being chosen with respect to the irregular shape of the container such that the change in effective submerged area of said conductive material with change in liquid level is proportional to the corresponding change in quantity of the liquid in the container, the other of said electrode members being provided throughout most of its area with an electrode surface portion uniformly spaced from said one electrode member and a strip portion of substantially uniform width extending from the top to the bottom thereof, said strip portion being disposed at a different spaced distance from said one member to provide a different capacitance relationship thereto, the conductive material on*

*said one member being further formed to define on said insulation material an edge extending substantially from the top to the bottom thereof equidistant from an edge of said strip portion, the extent of overlap of said strip portion with respect to said edge of said conductive material being adjustable to provide an initial adjustment of the capacitance between said two electrode members in a uniform manner along the length of the capacitor, whereby the change in capacitance between said electrode surfaces varies linearly with change in the quantity of liquid present in the container notwithstanding the irregular shape of the container.*

*5. In a capacitance-type gauge for measuring variations in the quantity of a dielectric liquid present in an irregularly shaped container wherein there is a non-linear relationship between change in liquid level and change in liquid quantity in such irregular container, a capacitor comprising two electrode members having spaced electrode surfaces with a predetermined initial capacitance therebetween and adapted to be mounted in the irregular container for immersion in the liquid therein to substantially the entire depth of the liquid and to receive the liquid in the space between said members, one of said electrode members comprising insulation material having on a part only of a surface thereof a conductive material constituting the electrode surface of said one member, the extent of said conductive material being chosen with respect to the irregular shape of the container such that the change in effective submerged area of said conductive material with change in liquid level is proportional to the corresponding change in quantity of the liquid in the container, the other of said electrode members being provided throughout most of its area with an*

*electrode surface portion uniformly spaced from said one electrode member and a strip portion of substantially uniform width extending from the top to the bottom thereof, said strip portion being disposed at a different spaced distance from said one member to provide a different capacitance relationship thereto, the extent of overlap of said strip portion with respect to the electrode surface of said one member being adjustable to provide an initial adjustment of the capacitance between said two electrode members in a uniform manner along the length of the capacitor, whereby the change in capacitance between said electrode members varies linearly with change in the quantity of liquid present in the container notwithstanding the irregular shape of the container.*

References Cited in the file of this patent or the original patent

UNITED STATES PATENTS

| | | |
|---|---|---|
| 1,108,793 | San Martin | Aug. 25, 1914 |
| 1,595,810 | Allcutt | Aug. 10, 1926 |
| 1,610,122 | Edenburg | Dec. 7, 1926 |
| 1,735,889 | Blough | Nov. 19, 1929 |
| 2,361,274 | Cravath et al. | Oct. 24, 1944 |
| 2,377,275 | Smith | May 29, 1945 |
| 2,409,073 | Sias | Oct. 8, 1946 |
| 2,464,716 | Piton | Mar. 15, 1949 |
| 2,544,012 | Edelman | Mar. 6, 1951 |

FOREIGN PATENTS

| | | |
|---|---|---|
| 243,318 | Great Britain | Dec. 20, 1926 |
| 938,646 | France | Apr. 12, 1948 |
| 938,682 | France | Apr. 12, 1948 |